(12) United States Patent
Cho

(10) Patent No.: US 12,039,174 B2
(45) Date of Patent: Jul. 16, 2024

(54) MEMORY CONTROLLER AND METHOD OF OPERATING THE SAME

(71) Applicant: SK hynix Inc., Gyeonggi-do (KR)

(72) Inventor: Kyoung Ku Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 6 days.

(21) Appl. No.: 17/966,487

(22) Filed: Oct. 14, 2022

(65) Prior Publication Data

US 2023/0342040 A1  Oct. 26, 2023

(30) Foreign Application Priority Data

Apr. 21, 2022 (KR) .......................... 10-2022-0049331

(51) Int. Cl.
*G06F 3/06* (2006.01)
(52) U.S. Cl.
CPC .......... *G06F 3/0617* (2013.01); *G06F 3/0653* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 2014/0376297 A1* | 12/2014 | Lasser | .................. | G11C 7/1006 365/148 |
| 2014/0376298 A1* | 12/2014 | Lasser | .................. | G11C 7/1006 365/148 |
| 2014/0379961 A1* | 12/2014 | Lasser | ................. | G06F 12/0246 711/103 |
| 2014/0379962 A1* | 12/2014 | Lasser | ................. | G06F 12/0246 711/103 |
| 2014/0380015 A1* | 12/2014 | Lasser | ................... | G06F 12/023 711/170 |
| 2015/0161044 A1* | 6/2015 | Lasser | ................. | G06F 12/0607 711/5 |

FOREIGN PATENT DOCUMENTS

| KR | 10-2014-0110021 A | 9/2014 |
|---|---|---|
| KR | 10-2017-0139730 A | 12/2017 |

\* cited by examiner

*Primary Examiner* — Kevin Verbrugge
(74) *Attorney, Agent, or Firm* — IP & T GROUP LLP

(57) ABSTRACT

Provided herein may be a memory controller and a method of operating the same. The method of operating a memory controller may include determining whether a reset request received from a host is valid, based on boot workload information related to a plurality of boot stages of the host, and performing a reset operation on a memory device depending on whether the reset request is valid.

22 Claims, 11 Drawing Sheets

FIG. 6

| Stages | | HW Reset | BW_INF |
|---|---|---|---|
| Boot Sequence | Power On/Off | ○ | Power Down Command History |
| | ROM Read | × | Host Request History |
| | Bootloader Load | × | |
| | Kernel Load | × | Kernel Recovery Abort History |
| Kernel Recovery | | ○ | |

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2022-0049331, filed on Apr. 21, 2022, the entire disclosure of which is incorporated herein by reference.

BACKGROUND

Field of Invention

Various embodiments of the present disclosure generally relate to an electronic device, and more particularly to a memory controller and a method of operating the memory controller.

Description of Related Art

A storage device is a device which stores data under the control of a host device such as a computer or a smartphone. The storage device may include a memory device in which data is stored and a memory controller which controls the memory device. Memory devices are classified into a volatile memory device and a nonvolatile memory device.

The volatile memory device is a memory device in which data is stored only when power is supplied and in which stored data is lost when the power supply is interrupted. Examples of the volatile memory device may include a static random access memory (SRAM) and a dynamic random access memory (DRAM).

The nonvolatile memory device may be a memory device in which stored data is retained even when the power supply is interrupted. Examples of the nonvolatile memory device may include a read only memory (ROM), a programmable ROM (PROM), an electrically programmable ROM (EPROM), an electrically erasable and programmable ROM (EEPROM), and a flash memory.

The storage device may receive a reset request from a host depending on the boot stage that the host enters. The storage device may perform a cold boot which turns off the power of a memory device and again turns on the power thereof in response to a reset request. The storage device may perform a sudden power-off recovery operation for recovery of data in a cold-booted memory device.

SUMMARY

Various embodiments of the present disclosure are directed to a memory controller for skipping an unnecessary reset request from a host, and a method of operating the memory controller.

An embodiment of the present disclosure may provide for a method of operating a memory controller. The method may include determining whether a reset request received from a host is valid, based on boot workload information related to a plurality of boot stages of the host, and performing a reset operation on a memory device depending on whether the reset request is valid.

An embodiment of the present disclosure may provide for a memory controller. The memory controller may include a boot workload information storage and a reset controller. The boot workload information storage may be configured to store boot workload information related to a plurality of boot stages of a host. The reset controller may be configured to determine, based on the boot workload information, whether a reset request received from the host is valid, and perform a reset operation on the memory device when it is determined that the reset request is valid.

An embodiment of the present disclosure may provide for a method of operating a controller. The method may comprises resetting a memory device in response to a valid reset request and ignoring an invalid reset request. The valid reset request is a reset request provided during a power-on stage or an operating system kernel recovery stage. The invalid reset request is a reset request provided after a read only memory (ROM) read stage, a bootloader load stage or an operating system kernel load stage. The stages are related to a booting operation of a host, from which the reset request is provided.

BRIEF DESCRIPTION OF THE DRAWINGS

FIG. 6 is a diagram illustrating information about whether a reset request received from a host is to be performed and boot workload information in respective stages according to an embodiment of the present disclosure.

DETAILED DESCRIPTION

Specific structural or functional descriptions in the embodiments of the present disclosure introduced in this specification are provided as examples to describe embodiments according to the concept of the present disclosure. The embodiments according to the concept of the present disclosure may be practiced in various forms, and should not be construed as being limited to the embodiments described in the specification.

Figure 1:
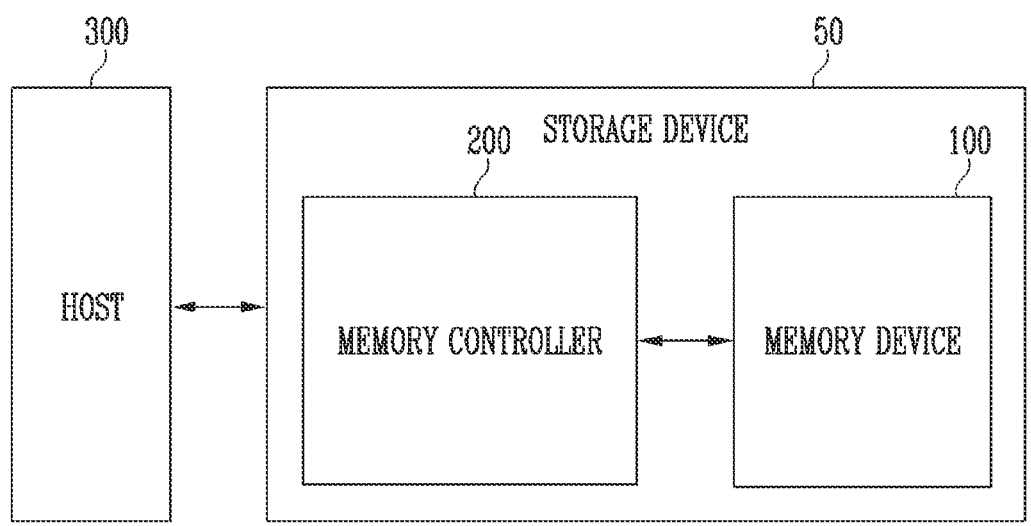
FIG. 1 is a diagram illustrating a storage device according to an embodiment of the present disclosure.

FIG. 1 is a diagram illustrating a storage device according to an embodiment of the present disclosure.

Referring to FIG. 1, a storage device 50 may include a memory device 100 and a memory controller 200 which controls the operation of the memory device 100. The storage device 50 may be a device which stores data under the control of a host 300, such as a mobile phone, a smartphone, an MP3 player, a laptop computer, a desktop computer, a game console, a television (TV), a tablet personal computer (PC), or an in-vehicle infotainment system.

The storage device 50 may be manufactured as any of various types of storage devices depending on a host interface that is a scheme for communication with the host 300. For example, the storage device 50 may be implemented as any of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The storage device 50 may be manufactured in any of various types of package forms. For example, the storage device 50 may be manufactured in any of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may be operated under the control of the memory controller 200. The memory device 100 may include a memory cell array including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells. One memory block may include a plurality of pages. In an embodiment, a page may be the unit by which data is stored in the memory device 100 or the unit by which data stored in the memory device 100 is read.

A memory block may be the unit by which data is erased. In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magnetoresistive RAM (MRAM), a ferroelectric RAM (FRAM), or a spin transfer torque RAM (STT-RAM). In the present specification, for convenience of description, a description is made on that the memory device 100 is a NAND flash memory.

The memory device 100 may receive a command and an address from the memory controller 200, and may access the area of the memory cell array, selected by the address. That is, the memory device 100 may perform an operation indicated by the command on the area selected by the address. For example, the memory device 100 may perform a write operation (i.e., a program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory controller 200 controls the overall operation of the storage device 50.

When power is applied to the storage device 50, the memory controller 200 may run firmware (FW). When the memory device 100 is a flash memory device, the memory controller 200 may run firmware such as a flash translation layer (FTL) for controlling communication between the host 300 and the memory device 100.

In an embodiment, the memory controller 200 may receive data and a logical block address (LBA) from the host 300, and may translate the logical block address (LBA) into a physical block address (PBA) indicating the address of memory cells which are included in the memory device 100 and in which data is to be stored.

The memory controller 200 may control the memory device 100 so that a program operation, a read operation or an erase operation is performed in response to a request received from the host 300. During a program operation, the memory controller 200 may provide a write command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may internally generate a command, an address, and data regardless of whether a request from the host 300 is received, and may transmit them to the memory device 100. For example, the memory controller 200 may provide commands, addresses, and data to the memory device 100 to perform background operations, such as a program operation for wear leveling and a program operation for garbage collection.

In an embodiment, the memory controller 200 may control two or more memory devices 100. In this case, the memory controller 200 may control the memory devices 100 depending on an interleaving scheme to improve operating performance. The interleaving scheme may be an operating manner in which the operating periods of two or more memory devices 100 are caused to overlap each other.

The memory controller 200 may control a plurality of memory devices 100 coupled to each other through one or more channels. Each memory device 100 may include one or more planes. Each plane may include a plurality of memory blocks.

The memory controller 200 may store boot workload information related to a plurality of boot stages of the host 300. The plurality of boot stages may include a power-on stage, a ROM read stage, a bootloader load stage, and an operating system (OS) kernel load stage, which are performed by the host 300.

The memory controller 200 may determine, based on the boot workload information, whether a reset request received from the host 300 is valid.

For example, the memory controller 200 may determine that a reset request, received after the ROM read stage, the bootloader load stage, or the OS kernel load stage have been performed by the host 300, is invalid. The memory controller 200 may ignore a reset request that is determined to be invalid.

The memory controller 200 may determine that a reset request, received after the power-on stage or in a kernel recovery stage, is valid. The memory controller 200 may perform a reset operation on the memory device 100 in response to the reset request that is determined to be valid. The reset operation may include a cold boot operation of turning off the power of the memory device 100 and again turning on the power thereof and a sudden power-off recovery operation of recovering data in the cold-booted memory device 100.

The host 300 may provide a reset request to the memory controller 200 in each boot stage. The host 300 may provide a reset request to the memory controller 200 after each of the power-on stage, the ROM read stage, the bootloader load stage, the OS kernel load stage and the OS kernel recovery stage.

In accordance with an embodiment of the present disclosure, the memory controller 200 ignores reset requests irrelevant to the operation of the memory device 100, among the reset requests received from the host 300, so that the number of unnecessary reset operations may be reduced and total boot time may be shortened, thus prolonging the lifetime of the memory device 100.

The host 300 may communicate with the storage device 50 using at least one of various communication standards or interfaces such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
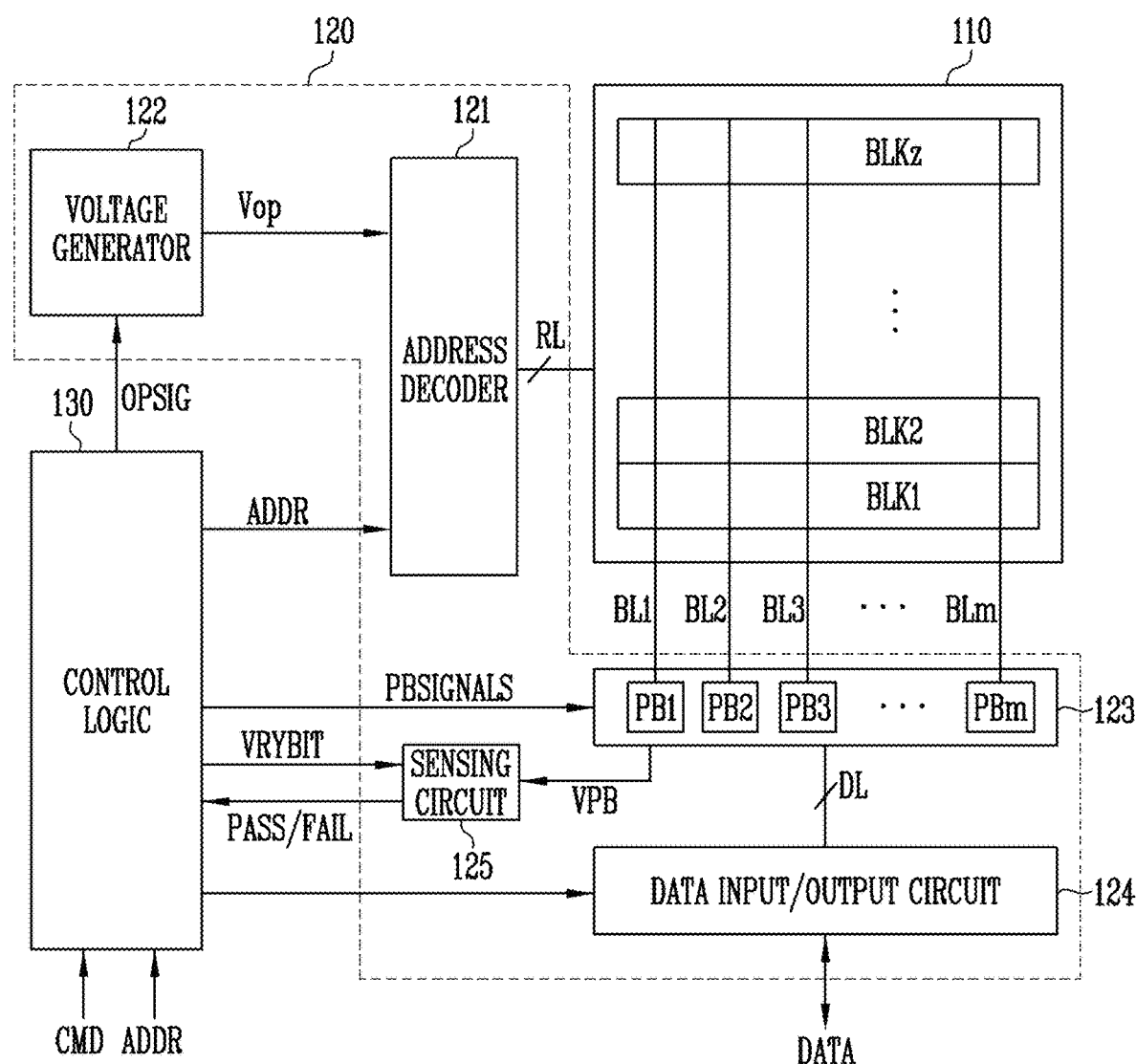
FIG. 2 is a diagram illustrating the structure of a memory device of FIG. 1 according to an embodiment of the present disclosure.

FIG. 2 is a diagram illustrating the structure of the memory device of FIG. 1 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz may be coupled to an address decoder 121 through row lines RL. The memory blocks BLK1 to BLKz are coupled to a read and write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line, among the plurality of memory cells, are defined as one physical page. That is, the memory cell array 110 may include a plurality of physical pages. In an embodiment of the present disclosure, each of the memory blocks BLK1 to BLKz included in the memory cell array 110 may include a plurality of dummy cells. For the dummy cells, one or more dummy cells may be coupled in series between a drain select transistor and memory cells and between a source select transistor and the memory cells.

Each of the memory cells of the memory device 100 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The peripheral circuit 120 may include the address decoder 121, a voltage generator 122, the read and write circuit 123, a data input/output circuit 124, and a sensing circuit 125.

The peripheral circuit 120 may drive the memory cell array 110. For example, the peripheral circuit 120 may drive the memory cell array 110 to perform a program operation, a read operation, and an erase operation.

The address decoder 121 is coupled to the memory cell array 110 through the row lines RL. The row lines RL may include drain select lines, word lines, source selection lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may be operated under the control of the control logic 130. The address decoder 121 receives addresses ADDR from the control logic 130.

The address decoder 121 may decode a block address, among the received addresses ADDR. The address decoder 121 may select at least one of the memory blocks BLK1 to BLKz according to the decoded block address. The address decoder 121 may decode a row address, among the received addresses ADDR. The address decoder 121 may select at least one of word lines of the selected memory block according to the decoded row address. The address decoder 121 may apply operating voltages Vop supplied from the voltage generator 122 to the selected word line.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to unselected word lines.

During a read operation, the address decoder 121 may apply a read voltage to the selected word line and apply a read pass voltage having a level higher than that of the read voltage to unselected word lines.

In accordance with an embodiment of the present disclosure, the erase operation of the memory device 100 is performed on a memory block basis. During the erase operation, the addresses ADDR input to the memory device 100 include a block address. The address decoder 121 may decode the block address and select at least one memory block according to the decoded block address. During the erase operation, the address decoder 121 may apply a ground voltage to word lines coupled to the selected memory block.

In accordance with an embodiment of the present disclosure, the address decoder 121 may decode a column address, among the received addresses ADDR. The decoded column address may be transferred to the read and write circuit 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The voltage generator 122 may be operated under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage to generate a plurality of operating voltages Vop having various voltage levels, and may generate the plurality of operating voltages Vop by selectively enabling the plurality of pumping capacitors under the control of the control logic 130. The generated operating voltages Vop may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130.

The first to m-th page buffers PB1 to PBm may transmit/receive data DATA to/from the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program voltage is applied to a selected word line. The memory cells in a selected page are programmed based on the received data DATA. Memory cells coupled to a bit line to which a program enable voltage (e.g., a ground voltage) is applied may have increased threshold voltages. The threshold voltages of memory cells coupled to a bit line to which a program inhibit voltage (e.g., a supply voltage) is applied may be maintained. During a program verify operation, the first to m-th page buffers PB1 to PBm may read the data DATA stored in the selected memory cells from the selected memory cells through the bit lines BL1 to BLm.

During a read operation, the read and write circuit 123 may read data DATA from the memory cells in the selected page through the bit lines BL, and may store the read data DATA in the first to m-th page buffers PB1 to PBm.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated under the control of the control logic 130.

The data input/output circuit 124 may include a plurality of input/output buffers (not illustrated) which receive input data DATA. During a program operation, the data input/output circuit 124 receives the data DATA to be stored from an external controller (not illustrated). During a read operation, the data input/output circuit 124 outputs the data DATA, received from the first to m-th page buffers PB1 to PBm included in the read and write circuit 123, to the external controller.

During a read operation or a verify operation, the sensing circuit 125 may generate a reference current in response to an enable bit signal VRYBIT generated by the control logic 130, and may output a pass signal or a fail signal to the control logic 130 by comparing a sensing voltage VPB received from the read and write circuit 123 with a reference voltage generated by the reference current.

The control logic 130 may be coupled to the address decoder 121, the voltage generator 122, the read and write circuit 123, the data input/output circuit 124, and the sensing circuit 125. The control logic 130 may control the overall operation of the memory device 100. The control logic 130 may be operated in response to a command CMD transferred from an external device.

The control circuit 130 may control the peripheral circuit 120 by generating various types of signals in response to the command CMD and addresses ADDR. For example, the control logic 130 may generate an operation signal OPSIG, the addresses ADDR, read and write circuit control signals PBSIGNALS, and the enable bit signal VRYBIT in response to the command CMD and the addresses ADDR. The control logic 130 may output the operation signal OPSIG to the voltage generator 122, output the addresses ADDR to the address decoder 121, output the read and write circuit control signals PBSIGNALS to the read and write circuit 123, and output the enable bit signal VRYBIT to the sensing circuit 125. In addition, the control logic 130 may determine whether a verify operation has passed or failed in response to the pass or fail signal PASS or FAIL output from the sensing circuit 125.

Figure 3:
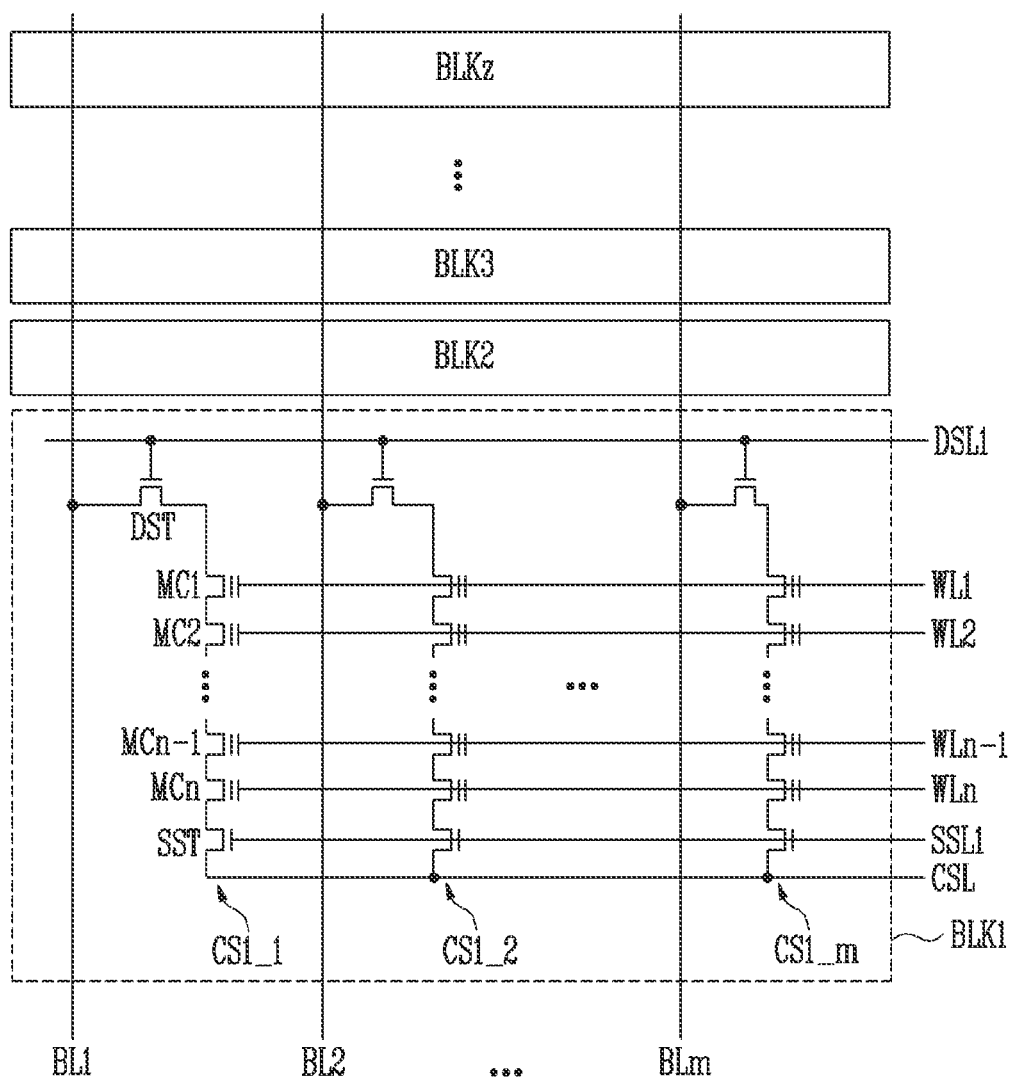
FIG. 3 is a diagram illustrating a memory cell array of FIG. 2 according to an embodiment of the present disclosure.

FIG. 3 is a diagram illustrating the memory cell array of FIG. 2 according to an embodiment of the present disclosure.

Referring to FIG. 3, first to z-th memory blocks BLK1 to BLKz are coupled in common to first to m-th bit lines BL1 to BLm. In FIG. 3, for convenience of description, elements included in the first memory block BLK1, among the plurality of memory blocks BLK1 to BLKz, are illustrated, and illustration of elements included in each of the remaining memory blocks BLK2 to BLKz are omitted. It will be understood that each of the remaining memory blocks BLK2 to BLKz has the same configuration as the first memory block BLK1.

The memory block BLK1 may include a plurality of cell strings CS1_1 to CS1_m, where m is a positive integer. The first to m-th cell strings CS1_1 to CS1_m are coupled to the first to m-th bit lines BL1 to BLm, respectively. Each of the first to m-th cell strings CS1_1 to CS1_m includes a drain select transistor DST, a plurality of memory cells MC1 to MCn, where n is a positive integer, which are coupled in series to each other, and a source select transistor SST.

A gate terminal of the drain select transistor DST included in each of the first to m-th cell strings CS1_1 to CS1_m is coupled to a drain select line DSL1. Gate terminals of the first to n-th memory cells MC1 to MCn included in each of the first to m-th cell strings CS1_1 to CS1_m are coupled to first to n-th word lines WL1 to WLn, respectively. A gate terminal of the source select transistor SST Included in each of the first to m-th cell strings CS1_1 to CS1_m is coupled to a source select line SSL1.

For convenience of description, the structure of each cell string will be described based on the first cell string CS1_1, among the plurality of cell strings CS1_1 to CS1_m. However, it will be understood that each of the remaining cell strings CS1_2 to CS1_m may be configured in the same manner as the first cell string CS1_1.

A drain terminal of the drain select transistor DST included in the first cell string CS1_1 is coupled to the first bit line BL1. A source terminal of the drain select transistor DST included in the first cell string CS1_1 is coupled to a drain terminal of the first memory cell MC1 included in the first cell string CS1_1. The first to n-th memory cells MC1 to MCn may be coupled in series to each other. A drain terminal of the source select transistor SST included in the first cell string CS1_1 is coupled to a source terminal of the n-th memory cell MCn included in the first cell string CS1_1. A source terminal of the source select transistor SST included in the first cell string CS1_1 is coupled to a common source line CSL. In an embodiment, the common source line CSL may be coupled in common to the first to z-th memory blocks BLK1 to BLKz.

The drain select line DSL1, the first to n-th word lines WL1 to WLn, and the source select line SSL1 are included in the row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
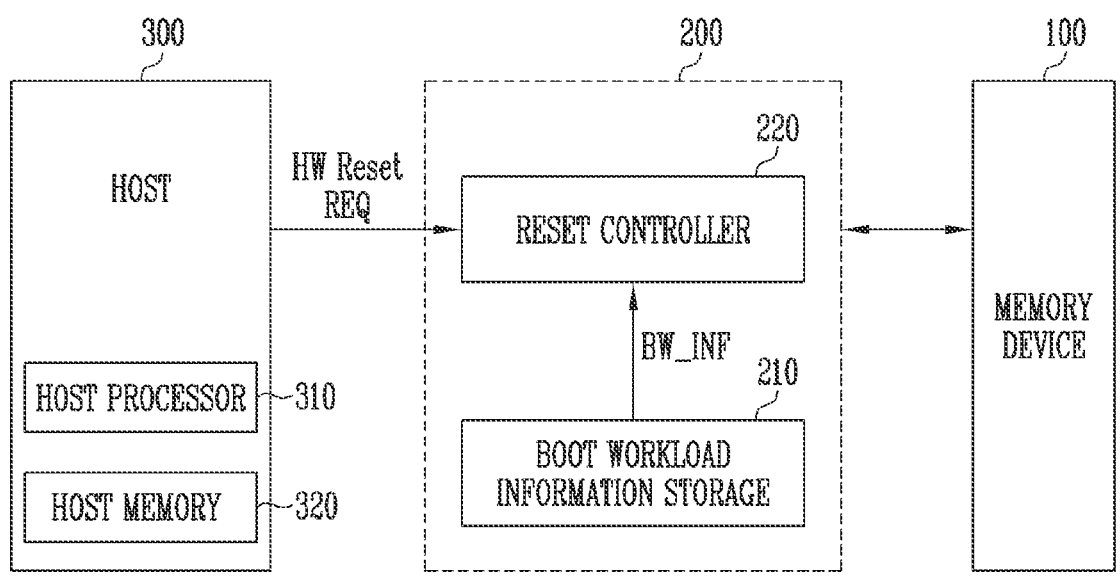
FIG. 4 is a diagram illustrating the configuration and operation of a memory controller according to an embodiment of the present disclosure.

FIG. 4 is a diagram illustrating the configuration and operation of a memory controller according to an embodiment of the present disclosure.

Referring to FIG. 4, the memory controller 200 may include a boot workload information storage 210 and a reset controller 220.

The boot workload information storage 210 may store boot workload information BW_INF related to a plurality of boot stages of the host 300. The plurality of boot stages may include a power-on stage, a ROM read stage, a bootloader load stage, and an operating system (OS) kernel load stage, which are performed by a host 300.

The boot workload information BW_INF may include a history of write requests and read requests received from the host 300. The boot workload information BW_INF may include a history of the amount of data corresponding to the write requests and read requests received from the host 300. The boot workload information BW_INF may include a history of transmission of responses to a power-down command, received from the host 300, to the host 300. The power-down command may be a command for querying whether the power of the memory device is capable of being turned off normally. The boot workload information BW_INF may include a history of reception of a notification message indicating that the kernel of an operating system running on the host 300 has entered a recovery mode.

The reset controller 220 may determine, based on the boot workload information BW_INF received from the boot workload information storage 210, whether a reset request HW Reset REQ received from the host 300 is valid.

The reset controller 220 may determine a target stage that the host 300 enters, among the plurality of boot stages, based on the boot workload information BW_INF.

For example, when a history of transmission of responses to the power-down command to the host 300 is included in the boot workload information BW_INF, the reset controller 220 may determine the target stage to be a power-on stage. When a history of reception of read requests or write requests from the host 300 is not included in the boot workload information BW_INF, the reset controller 220 may determine the target stage to be a ROM read stage. When the amount of data corresponding to read requests and write requests received from the host 300 in the boot workload information BW_INF is equal to or greater than a reference value, the reset controller 220 may determine the target stage to be a bootloader load stage. When a history of reception of a notification message indicating that, after the bootloader load stage, the kernel has entered a recovery mode is not included in the boot workload information BW_INF, the reset controller 220 may determine the target stage to be a kernel load stage. When a history of reception of a notification message indicating that, after the bootloader load stage, the kernel has entered a recovery mode is included in the boot workload information BW_INF, the reset controller 220 may determine the target stage to be a kernel recovery stage.

When the target stage is the ROM read stage, the bootloader load stage, or the OS kernel load stage, the reset controller 220 may determine that a reset request HW Reset REQ, received after the target stage is performed by the host 300, is invalid. When it is determined that the reset request HW Reset REQ is invalid, the reset controller 220 may ignore the reset request HW Reset REQ.

When the target stage is a power-on stage, the reset controller 220 may determine that a reset request HW Reset REQ, received after the target stage is performed by the host 300, is valid. The reset controller 220 may determine that a reset request HW Reset REQ, received in a kernel recovery stage, is valid. When it is determined that the reset request HW Reset REQ is valid, the reset controller 220 may perform a reset operation on the memory device 100.

The reset operation may include a cold boot operation of turning off the power of the memory device 100 and again turning on the power thereof and a sudden power-off recovery operation of recovering data in the cold-booted memory device 100.

The host 300 may include a host processor 310 and a host memory 320. The host processor 310 may provide a reset request HW Reset REQ to the memory controller 200 in each boot stage. When the power is turned on, the host processor 310 may provide a reset request HW Reset REQ to the memory controller 200. When the data stored in the ROM is read into the host memory 320, the host processor 310 may provide a reset request HW Reset REQ to the memory controller 200. When a bootloader is loaded into the host memory 320, the host processor 310 may provide a reset request HW Reset REQ to the memory controller 200. When the kernel of an operating system is loaded into the host memory 320, the host processor 310 may provide a reset request HW Reset REQ to the memory controller 200. When the host 300 is in the kernel recovery stage, the host processor 310 may provide a reset request HW Reset REQ to the memory controller 200.

In accordance with an embodiment of the present disclosure, among the reset requests HW Reset REQ received from the host 300 in the boot stages of the host 300, reset requests HW Reset REQ irrelevant to the operation of the memory device 100 may be ignored, whereby the number of unnecessary reset operations may be reduced, the total boot time may be shortened, and the lifetime of the memory device 100 may be prolonged.

Figure 5:
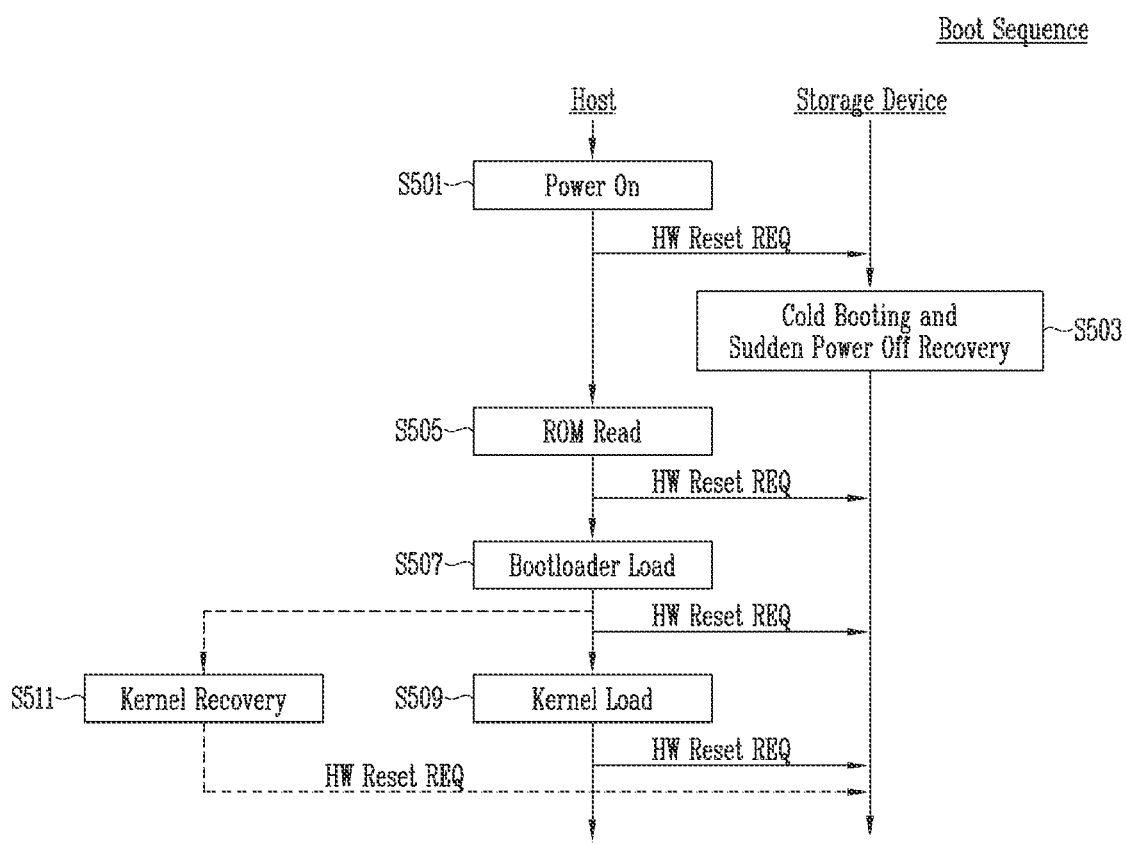
FIG. 5 is a flowchart illustrating the operation of a storage device depending on the boot sequence of a host and reset requests from the host according to an embodiment of the present disclosure.

FIG. 5 is a flowchart illustrating the operation of a storage device depending on the boot sequence of a host and reset requests from the host.

Referring to FIG. 5, the host may be powered on at operation S501. After being powered on, the host may provide a reset request HW Reset REQ to the storage device.

At operation S503, the storage device may determine that the reset request HW Reset REQ, received from the host, is valid, and may perform a reset operation. The reset operation may include a cold boot operation of turning off the power of the memory device and again turning on the power thereof and a sudden power-off recovery operation of recovering data in the cold-booted memory device.

At operation S505, the host may read a basic input/output system (BIOS) stored in ROM. After the BIOS stored in the ROM is read into the host memory, the host may provide a reset request HW Reset REQ to the storage device. The storage device may determine that the reset request HW Reset REQ, received from the host after the ROM read stage is performed, is invalid, and may ignore the reset request.

At operation S507, the host may load a bootloader into the host memory. After the bootloader is loaded into the host memory, the host may provide a reset request HW Reset REQ to the storage device. The bootloader may be a computer program for preparing for execution of the kernel of the operating system to run the operating system. The storage device may determine that the reset request HW Reset REQ, received from the host after the bootloader load stage is performed, is invalid, and may ignore the reset request.

After the bootloader load stage, when a history of reception of a notification message indicates that the kernel has entered a recovery mode, an operation S511 may be performed. Otherwise, an operation S509 may be performed.

At the operation S509, the host may load the kernel of the operating system into the host memory. After the kernel is loaded into the host memory, the host may provide a reset request HW Reset REQ to the storage device. The kernel, which is a core of the operating system, may be a program for managing communication between security and system resources, and between software and hardware. The storage device may determine that the reset request HW Reset REQ, received from the host after the kernel load stage is performed, is invalid, and may ignore the reset request.

At the operation S511, the host may provide a reset request HW Reset REQ to the storage device. The storage device may determine that the reset request HW Reset REQ, received from the host in the kernel recovery stage, is valid, and may perform the reset operation.

FIG. 6 is a diagram illustrating information about whether a reset request received from a host is to be performed and boot workload information in respective stages according to an embodiment of the present disclosure.

Referring to FIG. 6, the stages of the host may include a power on/off stage, a ROM read stage, a bootloader load stage, a kernel load stage, and a kernel recovery stage.

Boot workload information BW_INF may include a history of a power-down command received from the host. The power-down command may be a command for querying whether the power of a memory device is capable of being turned off normally. The boot workload information BW_INF may include a history of requests received from the host and the amount of data corresponding to the requests. The boot workload information BW_INF may include a history of reception of a notification message indicating that the kernel of an operating system running on the host has entered a recovery mode.

Each stage of the host may be determined based on the boot workload information BW_INF.

For example, the power on/off stage may be determined based on the history of the power-down command. When a history of transmission of responses to the power-down command to the host is included in the boot workload information BW_INF, the stage of the host may be determined to be the power-on/off stage.

The ROM read stage and the bootloader load stage may be determined based on the history of the requests received from the host and the amount of data corresponding to the requests. When a history of reception of read requests or write requests received from the host is not included in the boot workload information BW_INF, the stage of the host may be determined to be the ROM read stage. When the amount of data, corresponding to read requests and write requests received from the host, in the boot workload information BW_INF is equal to or greater than a reference value, the stage of the host may be determined to be the bootloader load stage.

The kernel load stage and the kernel recovery stage may be determined based on a history of reception of a notification message indicating that the kernel of the operating system running on the host has entered a recovery mode.

When a history of reception of a notification message indicating that, after the bootloader load stage, the kernel has entered a recovery mode is not included in the boot workload information BW_INF, the stage of the host may be determined to be the kernel load stage. When a history of reception of a notification message indicating that, after the bootloader load stage, the kernel has entered a recovery mode is included in the boot workload information BW_INF, the stage of the host may be determined to be the kernel recovery stage.

In FIG. 6, reset requests, received from the host in the power-on/off stage and the kernel recovery stage of the host, may be accepted. The reset requests, received from the host in the ROM read stage, the bootloader load stage, and the kernel load stage of the host, may be ignored.

Figure 7:
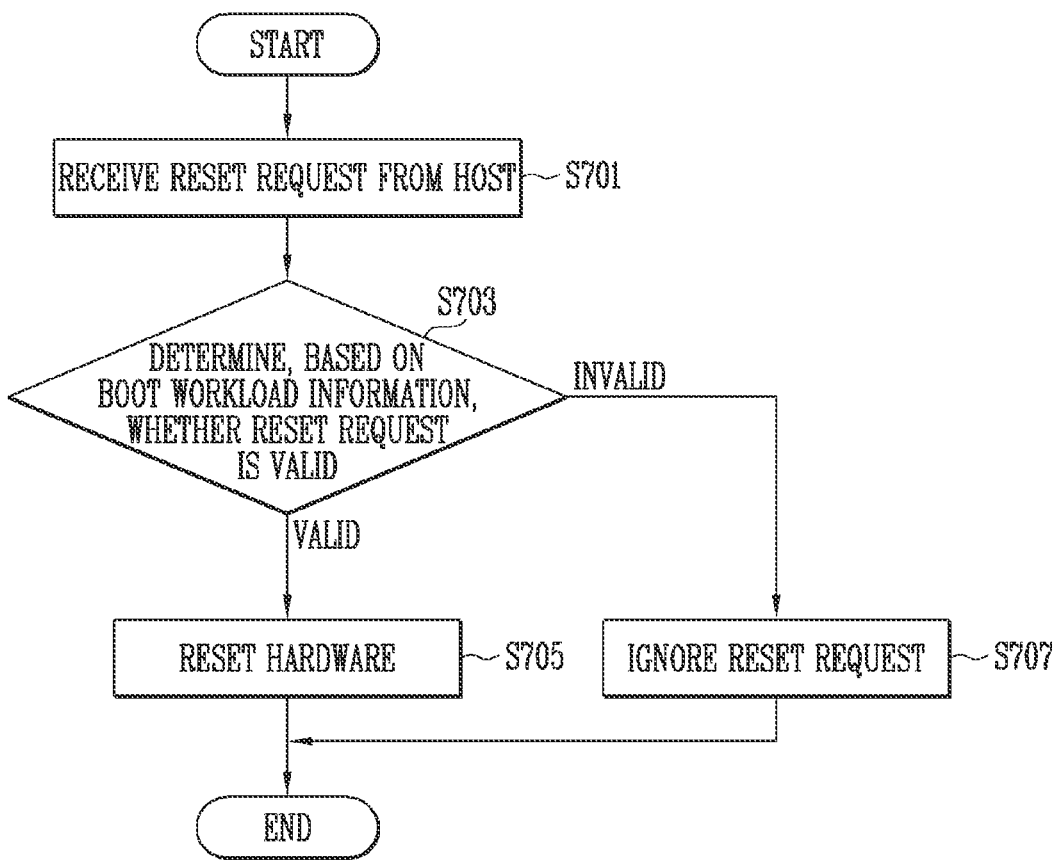
FIG. 7 is a flowchart illustrating the operation of a memory controller according to an embodiment of the present disclosure.

FIG. 7 is a flowchart illustrating the operation of a memory controller according to an embodiment of the present disclosure.

Referring to FIG. 7, at operation S701, the memory controller may receive a reset request from a host.

At operation S703, the memory controller may determine, based on boot workload information, whether the reset request is valid. Details of a process in which the memory controller determines whether a reset request is valid based on the boot workload information have been described above with reference to FIGS. 4 to 6, and thus a detailed description thereof will be omitted here. As a result of the determination, when the reset request is valid, the process proceeds to operation S705, whereas when the reset request is invalid, the process proceeds to operation S707.

At operation S705, the memory controller may perform a hardware reset operation on the memory device. The reset operation may include a cold boot operation and a sudden power-off recovery operation.

At operation S707, the memory controller may ignore the reset request.

Figure 8:
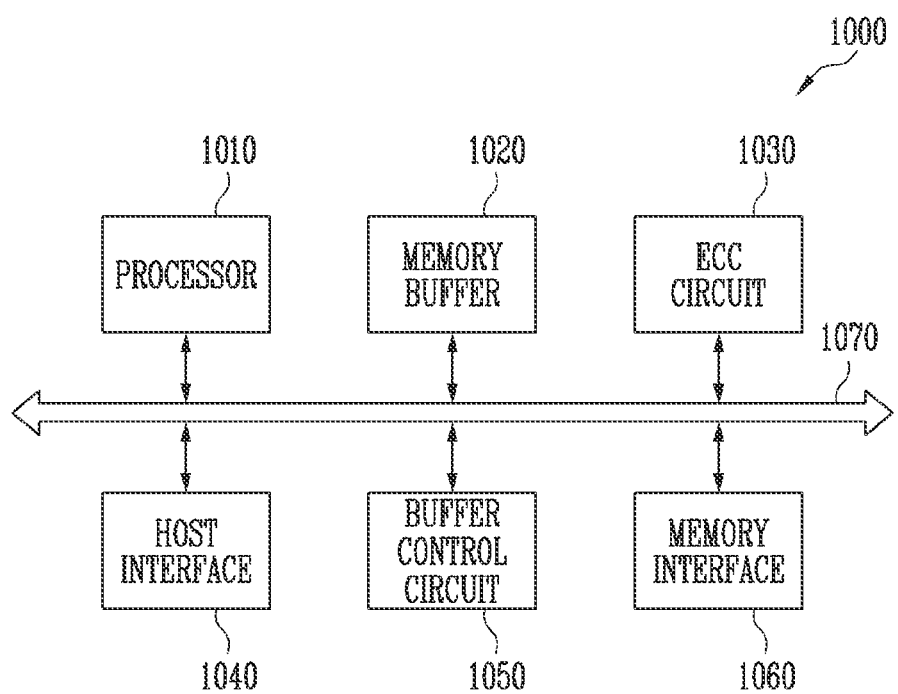
FIG. 8 is a diagram illustrating the memory controller of FIG. 1 according to an embodiment of the present disclosure.

FIG. 8 is a diagram illustrating the memory controller of FIG. 1 according to an embodiment of the present disclosure.

Referring to FIG. 8, a memory controller 1000 is coupled to a host and a memory device. In response to a request from the host, the memory controller 1000 may access the memory device. For example, the memory controller 1000 may control read, write, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide a channel between components of the memory controller 1000.

The processor 1010 may control the overall operation of the memory controller 1000 and perform a logical operation.

The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform a function of a flash translation layer (FTL). The processor 1010 may translate a logical block address (LBA), provided by the host, into a physical block address (PBA) through the FTL. The FTL may receive the logical block address (LBA) and translate the LBA into the physical block address (PBA) using a mapping table. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored to the memory device, and may be programmed to a memory cell array.

The processor 1010 may derandomize the data received from the memory device during a read operation. For example, the processor 1010 may derandomize the data received from the memory device using a derandomizing seed. Derandomized data may be output to the host.

In an embodiment, the processor 1010 may run software or firmware to perform the randomizing or derandomizing operation.

The memory buffer 1020 may be used as a working memory, a cache memory, or a buffer memory of the processor 1010. The memory buffer 1020 may store codes and commands that are executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included, as the component of the memory interface 1060, in the memory interface 1060.

The host interface 1040 may communicate with the external host under the control of the processor 1010. The host interface 1040 may perform communication using at least one of various communication standards or interfaces such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and Load Reduced DIMM (LRDIMM) communication standards or interfaces.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may transmit data in the memory controller 1000, and the control bus may transmit control information, such as commands or addresses, in the memory controller 1000. The data bus and the control bus may be separated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 9:
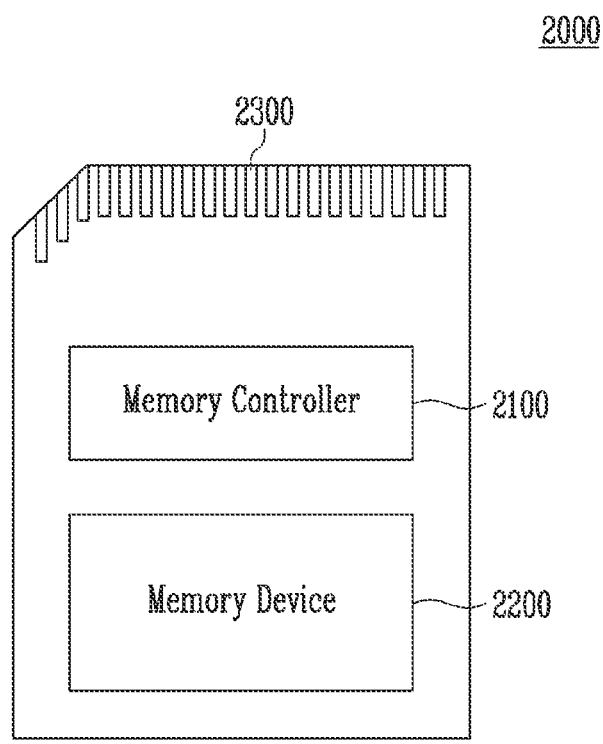
FIG. 9 is a block diagram illustrating a memory card system to which a storage device according to an embodiment of the present disclosure is applied.

FIG. 9 is a block diagram illustrating a memory card system to which a storage device according to an embodiment of the present disclosure is applied.

Referring to FIG. 9, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same manner as the memory controller 200, described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication standard. In an embodiment, the memory controller 2100 may communicate with the external device through at least one of various communication standards or interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and nonvolatile memory express (NVMe). In an embodiment, the connector 2300 may be defined by at least one of the above-described various communication standards or interfaces.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

The memory controller 2100 and the memory device 2200 may be integrated into a single semiconductor device to form a memory card. For example, the memory controller 2100 and the memory device 2200 may be integrated into a single semiconductor device to form a memory card, such as a PC card (i.e., personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 10:
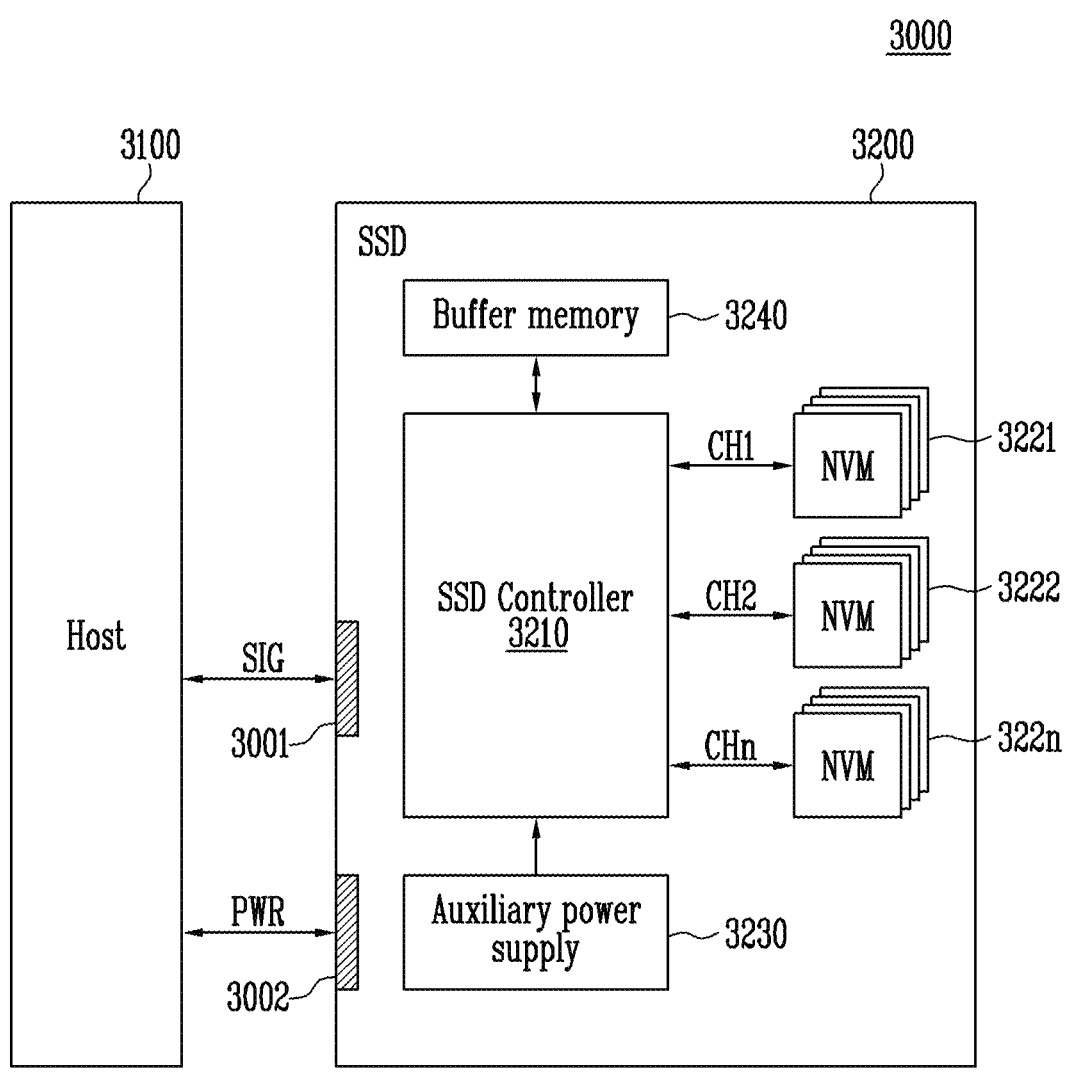
FIG. 10 is a block diagram illustrating a solid-state drive (SSD) system to which a storage device according to an embodiment of the present disclosure is applied.

FIG. 10 is a block diagram illustrating a solid state drive (SSD) system to which a storage device according to an embodiment of the present disclosure is applied.

Referring to FIG. 10, an SSD system 3000 may include a host 3100 and an SSD 3200. The SSD 3200 may exchange a signal SIG with the host 3100 through a signal connector 3001, and may receive power PWR through a power connector 3002. The SSD 3200 may include an SSD controller 3210, a plurality of flash memories 3221 to 322n, an auxiliary power supply 3230, and a buffer memory 3240.

In accordance with an embodiment of the present disclosure, the SSD controller 3210 may perform the function of the memory controller 200, described above with reference to FIG. 1.

The SSD controller 3210 may control the plurality of flash memories 3221 to 322n in response to the signal SIG received from the host 3100. In an embodiment, the signal SIG may include signals based on the interfaces of the host 3100 and the SSD 3200. For example, the signal SIG may be a signal defined by at least one of various communication standards or interfaces such as universal serial bus (USB), multimedia card (MMC), embedded MMC (eMMC), peripheral component interconnection (PCI), PCI-express (PCI-e or PCIe), an advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and nonvolatile memory express (NVMe) communication standards or interfaces.

The auxiliary power supply 3230 may be coupled to the host 3100 through the power connector 3002. The auxiliary power supply 3230 may be supplied with power PWR from the host 3100, and may be charged. The auxiliary power supply 3230 may supply the power to the SSD 3200 when the supply of power from the host 3100 is not smoothly performed. In an embodiment, the auxiliary power supply 3230 may be located inside the SSD 3200 or located outside the SSD 3200. For example, the auxiliary power supply 3230 may be located in a main board, and may also provide auxiliary power to the SSD 3200.

The buffer memory 3240 may function as a buffer memory of the SSD 3200. For example, the buffer memory 3240 may temporarily store data received from the host 3100 or data received from the plurality of flash memories 3221 to 322n, or may temporarily store metadata (e.g., mapping tables) of the flash memories 3221 to 322n. The buffer memory 3240 may include volatile memories, such as DRAM, SDRAM, DDR SDRAM, LPDDR SDRAM, and GRAM, or nonvolatile memories, such as FRAM, ReRAM, STT-MRAM, and PRAM.

Figure 11:
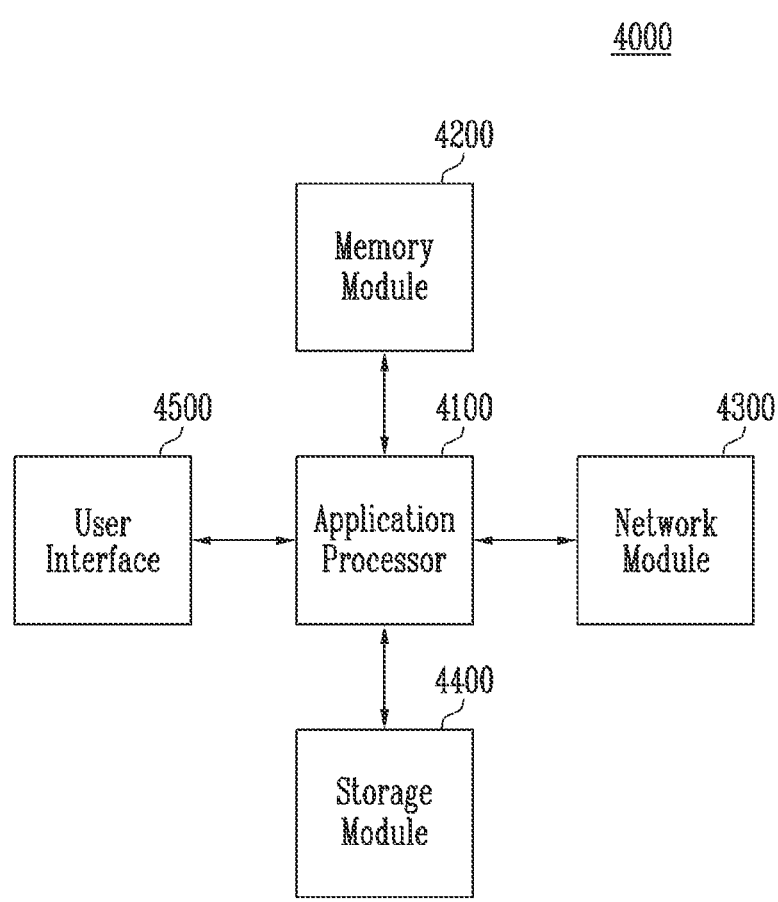
FIG. 11 is a block diagram illustrating a user system to which a storage device according to an embodiment of the present disclosure is applied.

FIG. 11 is a block diagram illustrating a user system to which a storage device according to an embodiment of the present disclosure is applied.

Referring to FIG. 11, a user system 4000 may include an application processor 4100, a memory module 4200, a network module 4300, a storage module 4400, and a user interface 4500.

The application processor 4100 may execute components included in the user system 4000, an operating system (OS), a user program or the like. In an embodiment, the application processor 4100 may include controllers, interfaces, graphic engines, etc. for controlling the components included in the user system 4000. The application processor 4100 may be provided in the form of a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM or nonvolatile RAMs such as PRAM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, wireless LAN (WLAN), UWB, Bluetooth, or WiFi. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a 3D structure. In an embodiment, the storage module 4400 may be provided as a removable storage medium (removable drive), such as a memory card or an external drive of the user system 4000.

In an embodiment, the storage module 4400 may include a plurality of nonvolatile memory devices, each of which may be operated in the same manner as the memory device 100, described above with reference to FIG. 1. The storage module 4400 may be operated in the same manner as the storage device 50, described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as an a liquid crystal display (LCD), an organic light-emitting diode (OLED) display device, an active matrix OLED (AMOLED) display device, an LED, a speaker, and a monitor.

In accordance with the present disclosure, there are provided a memory controller for skipping an unnecessary reset request from a host, and a method of operating the memory controller.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A method of operating a memory controller, the method comprising:
   determining whether a reset request received from a host is valid, based on boot workload information related to a plurality of boot stages of the host; and
   performing a reset operation on a memory device depending on whether the reset request is valid.

2. The method according to claim 1, wherein the plurality of boot stages comprise a power-on stage, a read only memory (ROM) read stage, a bootloader load stage, an operating system kernel load stage and a kernel recovery stage that are performed by the host.

3. The method according to claim 2, wherein determining whether the reset request is valid includes
   determining a target stage that the host enters among the plurality of boot stages based on the boot workload information; and
   determining whether the reset request is valid based on the target stage in which the host provides the reset request with the memory controller.

4. The method according to claim 3, wherein:
   the determining the target stage includes determining the power-on stage as the target stage when the boot workload information includes a history of transmission of a response to a power-down command received from the host, the response being transmitted to the host, and
   the power-down command is a command querying whether power of the memory device is capable of being turned off normally.

5. The method according to claim 3, wherein the determining the target stage includes determining the ROM read stage as the target stage when the boot workload information does not include a history of reception of a read request or a write request from the host.

6. The method according to claim 3, wherein the determining the target stage includes determining the bootloader load stage as the target stage when an amount of data corresponding to a read request and a write request received from the host is equal to or greater than a reference value, the boot workload information includes information of the amount of data.

7. The method according to claim 3, wherein the determining the target stage includes determining the operating system kernel load stage as the target stage when the boot workload information does not include a history of reception of a notification message indicating that, after the bootloader load stage, the kernel has entered a recovery mode.

8. The method according to claim 2, wherein the determining whether the reset request is valid includes determining, as invalid, the reset request, which is received after the ROM read stage, the bootloader load stage or the operating system kernel load stage.

9. The method according to claim 2, wherein the determining whether the reset request is valid includes determining, as valid, the reset request, which is received in the power-on stage or the kernel recovery stage.

10. The method according to claim 1, wherein:
    the reset operation is performed when the reset request is valid, and
    the reset operation comprises:
    performing a cold boot of turning off power of the memory device and again turning on the power, and
    a sudden power-off recovery operation on the memory device.

11. The method according to claim 1, further comprising ignoring the reset request when the reset request is invalid.

12. A memory controller comprising:
    a boot workload information storage configured to store boot workload information related to a plurality of boot stages of a host; and
    a reset controller configured to:
    determine, based on the boot workload information, whether a reset request received from the host is valid, and
    perform a reset operation on the memory device when it is determined that the reset request is valid.

13. The memory controller according to claim 12, wherein the plurality of boot stages comprise a power-on stage, a read only memory (ROM) read stage, a bootloader load stage, and an operating system kernel load stage that are performed by the host.

14. The memory controller according to claim 13, wherein the reset controller determines a target stage that the host enters among the plurality of boot stages based on the boot workload information and whether the reset request is valid based on the target stage in which the host provides the reset request with the memory controller.

15. The memory controller according to claim 14, wherein:
    the reset controller is configured to determine the power-on stage as the target stage when the boot workload information includes a history of transmission of a response to a power-down command received from the host, the response being transmitted to the host, and
    the power-down command is a command querying whether power of the memory device is capable of being turned off normally.

16. The memory controller according to claim 14, wherein the reset controller is configured to determine the ROM read stage as the target stage when the boot workload information does not include a history of reception of a read request or a write request from the host.

17. The memory controller according to claim 14, wherein the reset controller is configured to determine the bootloader load stage as the target stage when an amount of data corresponding to a read request and a write request received from the host is equal to or greater than a reference value, the boot workload information including information of the amount of data.

18. The memory controller according to claim 14, wherein the reset controller is configured to determine the operating system kernel load stage as the target stage when the boot workload information does not include a history of reception of a notification message indicating that, after the bootloader load stage, the kernel has entered a recovery mode.

19. The memory controller according to claim 13, wherein the reset controller is configured to determine, as invalid, the reset request, which is received after the ROM read stage, the bootloader load stage or the operating system kernel load stage, and wherein the reset controller is further configured to ignore the reset request determined as invalid.

20. The memory controller according to claim 13,
wherein the reset controller is configured to determine, as valid, the reset request, which is received in the power-on stage or a recovery mode for the kernel, and
wherein the reset operation includes:
  a cold boot of turning off power of the memory device and again turning on the power, and
  a sudden power-off recovery operation on the memory device.

21. An operating method of a controller, the operating method comprising:
  resetting a memory device in response to a valid reset request; and
  ignoring an invalid reset request,
  wherein the valid reset request is a reset request provided during a power-on stage or an operating system kernel recovery stage,
  wherein the invalid reset request is a reset request provided after a read only memory (ROM) read stage, a bootloader load stage or an operating system kernel load stage, and
  wherein a plurality of stages including the power-on stage, the ROM read stage, the bootloader load stage, the operating system kernel load stage, and the operating system kernel recovery stage are related to a booting operation of a host, from which the reset request is provided.

22. The operating method of claim 21,
further comprising identifying, as a current stage of the host, one of the plurality of stages based on information stored in the controller and related to the respective stages,
wherein the plurality of stages have a sequence of the power-on stage, the ROM read stage, the bootloader load stage, the operating system kernel load stage and then the operating system kernel recovery stage.

* * * * *